United States Patent
Brooks et al.

[15] 3,668,286

[45] June 6, 1972

[54] FIBERBOARD PRODUCED FROM WOOD PARTICLES HAVING A 5 TO 25 PERCENT MOISTURE CONTENT PRIOR TO STEAMING AND MECHANICAL REDUCTION IN THE FORMATION PROCESS

[72] Inventors: Stanley H. W. Brooks; Harry A. Raddin, both of Richmond, Va.

[73] Assignee: Miller Hofft, Inc., Richmond, Va.

[22] Filed: Apr. 14, 1970

[21] Appl. No.: 28,503

[52] U.S. Cl. .................................. 264/26, 162/13, 162/192, 162/225
[51] Int. Cl. ........................................... B29j 5/02, D21j 1/06
[58] Field of Search ................ 162/192, 206, 28, 68, 26, 207, 162/13, 18, 4, 24, 225, 226, 218, 221; 264/109, 26

[56] References Cited

UNITED STATES PATENTS 3,207,819  9/1965  Raddin et al. ...................... 264/109 X
3,130,114  4/1964  Nagy et al. ........................... 162/26 X Primary Examiner—S. Leon Bashore
Assistant Examiner—Richard H. Tushin
Attorney—Stevens, Davis, Miller & Mosher

[57] ABSTRACT

Fiberboard is produced by subjecting a mass of wood particles that have previously been dries to a moisture content in the range of about 5 to 25 percent to steaming and mechanical reduction to form a mass of lignocellulosic material in fibrous form; mixing the latter with a solution of the essentially unreacted ingredients of a thermosetting resin; compressing the resulting mass to desired thickness between separately heated platens; creating between said platens and throughout said mass a high frequency electric field; and maintaining said field for a time sufficient to initiate and at least partially complete the reaction of said ingredients; said solution of essentially unreacted ingredients of thermosetting resin having a viscosity under about 100 c.p.s. and a resin solids content of at least about 45 percent.

7 Claims, No Drawings

FIBERBOARD PRODUCED FROM WOOD PARTICLES HAVING A 5 TO 25 PERCENT MOISTURE CONTENT PRIOR TO STEAMING AND MECHANICAL REDUCTION IN THE FORMATION PROCESS

It is an object of this invention to provide a method of making thick, medium to high density fiberboard.

It is a further object of this invention to provide a method as aforesaid using high frequency dielectric heating in conjunction with superficial heating to accelerate the curing process.

It is a further object of this invention to provide a method as aforesaid in which the binder is almost wholly activated subsequent to mixing with the fibrous material of the board.

It is a further object of this invention to provide a method as aforesaid in which the fiber is produced from wood particles of low moisture content which have been steamed and mechanically reduced in a steam atmosphere.

It is a further object of this invention to provide an improved thick fiberboard of medium to high density.

The advantages of this invention are realized to the greatest possible extent when the basic board material is fiber made from dry wood and the binder is a solution, suspension or colloid of resin-forming material. The fiber with which the present invention is concerned includes steamed and mechanically reduced cellulosic or lignocellulosic material such as wood whose moisture content is not greater than 25 percent (wet basis) or in other words, a truly fibrous material. The fibers have width and thickness approximately equal and far smaller in extent than the length. A preferred form is produced by steaming reduced dry wood to soften the wood, the softened wood being mechanically reduced while still under steam pressure by any of several conventional attrition mills. The resultant fiber mass is then dried as desired, mixed with binder, pressed and cured.

It is common practice in the making of wood fiber to subject comminuted wood particles such as pulp chips, hammer-milled blocks, shavings and sawdust to a softening process by steaming before mechanically reduced them to fiber in a steam atmosphere. However, the wood has to be green or wet, that is, at a moisture content of not less than 30 percent. If the wood particles have a moisture content less than 30 percent, the wood particles are soaked in water and/or additional water is added to the steam digesting vessel to increase the moisture content to the required level. When the fiber is subsequently dried, removal of the added water introduces an extra drying load and cost.

This invention comprises the use of wood particles that have previously been kiln-dried, air-dried or force-dried and whose moisture content is in the range of 5 to 25 percent which are then steamed and mechanically reduced in a steam atmosphere to fiber without the addition of water in liquid phase. The use of dry wood particles as a raw material to make fiber by steaming and attrition in a steam atmosphere nearly eliminates the necessity of subsequently drying the fiber. It also becomes practical to use dry wood particles such as kiln-dried and air-dried chips, shavings and sawdust which have not heretofore been considered as suitable raw materials for fiber due to the difficulty of increasing the moisture content to a level of at least 30 percent and the additional drying cost.

It has been discovered that fiber produced by the aforesaid method of using dry wood improves the physical properties of fiberboard made therefrom.

For the purposes of this invention, any resin or resin mixture which performs physically as described hereinafter may be used. In practice, for reasons of cost, however, urea-formaldehyde and melamine-formaldehyde resins, or mixtures of these are used, and while not excluding other resins which are or could be used, the present discussion will be directed primarily to those named.

In practice, heretofore, urea or melamine, or both, are partially reacted with formaldehyde to produce a polymer or resin of relatively high molecular weight. These are the conventional cooked resins of commerce which will be referred to herein as polymeric adhesives. These materials are also called urea-formaldehyde or urea-melamine-formaldehyde resins. In practice, a polymeric adhesive with a suitable catalyst is mixed with wood particles and under carefully controlled conditions of time and temperature is further polymerized and condensed to a rigid form, thus acting as a binder for the wood particles. The production of polymeric adhesives must be carried out separately under controlled conditions. This separate step adds to the cost of the adhesive. The polymeric adhesives are substantially advanced toward the polymers which form the bond. Therefore, they impart high viscosity to water solutions and tackiness to treated fibers.

In some applications, such as the manufacture of particle board using wood particles such as chips, shavings, sawdust and flakes, and foundry sandcores, the tackiness and high viscosity of polymeric adhesives is advantageous in maintaining the shape of preformed articles. However, these properties present severe mechanical mixing and material-handling problems especially when the particle size becomes attenuated as in fiberboard.

This invention utilizes a resin system of low viscosity and little tackiness comprising essentially unreacted and unpolymerized components of amino resins in the presence of catalysts and, if desired, including suitable buffering agents. For purposes of this invention, any amino resin component which performs chemically or physically as called for hereinafter may be used. In practice, formaldehyde, urea, melamine and methylol urea solutions are used. Methylol Urea-Formaldehyde solutions such as UF Concentrate 85 (as produced by Allied Chemical Corporation) and Sta-Form 60 (as produced by Georgia Pacific Corporation) and others are used as a source of urea and formaldehyde for resin manufacture and other uses. These resin systems of essentially unreacted components of amino resins are mixed with a fiber prepared from dry wood particles; the mixture of resin and fiber formed into a mat; precompressed to acceptable thickness for introduction into realistically spaced platens of a press; compressed between heated press platens to a predetermined ultimate thickness; heated by the application of a high frequency field between the platens to a point at which the unreacted components of the amino type resins react to condense and polymerize and to adhere the fibers together by advancing directly to the rigid bond stage, apparently not stopping at the polymeric adhesive stages of conventional urea and melamine resins.

The platens are heated to a temperature which prohibits the condensation of water driven to the surface of the board during the electric heating phase, and permits the springing off of such moisture as steam upon relief of the platen pressure. Since such moisture is held as steam, or at least as saturated liquid at or about the interface between the platens and the board surface, the springing off of steam upon relief of platen pressure does not disrupt either the surface or the internal structure of the board.

Experiments have shown that, given proper equipment, densities of 60–70 lb./cu. ft. can be reached even at thicknesses of 3 inches or more. The following table represents experience to date, and not the ultimate limitations of the process:

| Thickness | Density |
| --- | --- |
| ⅜" to 1" | up to 60 lb./cu. ft. |
| 1" to 1½" | up to 50 lb./cu. ft. |
| 1½" to 3" | up to 40 lb./cu. ft. |

The above limitations are those of equipment design only. It is entirely feasible to make board 3 inches thick at a density of 60 lb./cu. ft. by using a proper press size and pressure.

A typical formulation of an unreacted ureaformaldehyde solution is as follows:

Formulation No. I

| | Parts by Weight |
|---|---|
| Urea | 100 |
| Formaldehyde | 80 |
| Water | 55 |
| Catalyst | 4.5 |

The viscosity of such a solution is about 25 centipoises and the resin solids content is 60 percent. The resin treatment of the fiber may be from 4 to 25 percent of the ultimate board, based on the oven dry (OD) weight of the fiber. It may be noted that a conventional, prereacted solution of urea-formaldehyde would have a viscosity of about 200 cps, and hence would be far too viscous to mix readily with fiber of the type here contemplated.

A typical formulation of an unreacted urea-melamine-formaldehyde solution is as follows:

Formulation No. II

| | Parts by Weight |
|---|---|
| Urea | 66.5 |
| Melamine | 46.5 |
| Formaldehyde | 80.0 |
| Water | 72.0 |
| Catalyst | 2.0 |

The above formulation represents an improvement, performancewise, in the final product over that of the preceding "all urea" formulation. The improvement is obtained, however, at some extra cost but is well worthwhile for many purposes. It involves a substitution of melamine for a part of the urea, the substitution being based on amino groups.

Typical formulations of essentially unreacted urea formaldehyde and urea-melamine formaldehyde solutions using methylol urea-formaldehyde solutions are as follows, in parts by weight:-

| Formulation No. | III | IV | V |
|---|---|---|---|
| UF-85 | 100 | 100 | 100 |
| Urea | 50 | 46 | 25 |
| Melamine | 0 | 5.8 | 35 |
| Water | 63 | 70 | 79 |
| Catalyst | 3.3 | 1.5 | 1.5 |

UF-85 is a solution of methylol ureas and formaldehyde containing the equivalent of 60 percent formaldehyde, 25 percent urea and 15 percent water. Formulation No. III is similar to that of Formulation No. I given heretofore and Formulation No. V is similar to that of Formulation No. II given heretofore.

Formulations, such as No. I and No. III, which do not contain melamine require no external heating or cooling except to maintain a reasonable ambient temperature. A buffering agent such as aqueous ammonia or similar acting agents are usually used in the catalyst which also contains an acid salt to provide suitable pot life.

Formulations, such as No. II, No. IV and No. V, which contain melamine require heating to solubilize the normally insoluble melamine crystals. This is accomplished by externally heating the formulation without catalyst to about 160° F. and cooling immediately. The catalyst is added after solubilization and cooling to about 85° F. Aqueous ammonia can alternatively be added to the formulations, without acid catalyst, which facilitates the solubilizing of the melamine at a temperature of about 80° to 100° F.

The resin solids in these type formulations can practically be between about 45 and 65 percent. All have a low viscosity between about 25 and 75 centipoises and have very little tackiness.

This invention further includes the high frequency heating of the board at a frequency of from about three to about fifteen megacycles. The unit upon which the present process was developed has a rated output of 15 kw. between the press platens, which are 39 × 42 inches in dimensions. The platens are maintained at about 300° F. It has been found that if the platens are maintained at room temperature, and the mat heated by high frequency, water migrates to the platens and condenses on the platen surfaces leaving the finished board wet and weak at the surfaces. The fiber mass between the platens has a conductivity of about 0.03 B.T.U./hour/square foot/° F./foot of thickness, and in a total heating time of about 70 to about 420 seconds it is clear that the platens cannot deliver much heat into the board. Where the platens are believed to make a real contribution, however, is in supplying heat of vaporization to the liquid driven to the surface of the board by the high frequency internal heating. The specific heat of the fiber is only 0.4 B.T.U./lb./°F., while the heat of vaporization of water is 970 B.T.U./lb. Even a small proportion of water, therefore, represents a considerable heat demand if condensation at the surface is to be avoided.

With a 15 kw. unit, about 60 seconds will be required to bring the board to 212° F. The rest of the time and power is used to react the chemicals and evaporate the moisture both actual and formed by reaction. The reaction time appears to be an independent variable, though there is some evidence that the high frequency field acts to accelerate the reaction. The rate of reaction, as noted heretofore, is affected by catalysts and temperature.

The mat thickness of a 1-½ inch board at formation will be about 36 inches and this will be reduced by precompression to about 8 inches. This presents a real problem in mat formation. It has been found, however, that if two 18″ mats are formed, and precompressed to 4 inches of thickness, they may be superimposed and reduced to 1-½ inches between the platens of the high frequency press. After curing, the board is of uniform density and is free of interface weakness. The platens are subjected to whatever pressure is needed to establish the desired caliper. The density is determined by the initial mat weight. The actual pressure between adjacent fibers is neither known nor determinable.

The use of additives such as size, fungicides, insecticides, drying oils, etc., is conventional. These preferably are added during the mixing of the fiber with the resinous binders.

In the following table, a comparison is made of the physical properties of board made with fiber produced from wet wood and from dry wood. In each example, the fiber is treated with an essentially unreacted urea-formaldehyde solution as the binder, compressed to caliper in a steam-heated hydraulic press and heated by means of a high frequency field using a substantially constant frequency of six megacycles with only such minor variations as were necessary to maintain substantially constant power input to the boards.

| Board Type | 1 | 2 | 3 | 4 |
|---|---|---|---|---|
| Raw material for fiber | Wood chips | Wood chips | Wood sawdust | Wood sawdust |
| Moisture content wood % (wet basis) | 30–60 | 5–25 | 30–60 | 5–25 |
| Board density— lb./cu.ft. OD | 42 | 42 | 42 | 42 |
| Board thickness—in. | 0.8 | 0.8 | 0.8 | 0.8 |
| % resin treatment | 8 | 8 | 8 | 8 |
| % wax treatment | 1 | 1 | 1 | 1 |
| Press platen temperature—°F. | 300 | 300 | 300 | 300 |
| HF heating time—sec. | 160 | 160 | 160 | 160 |
| Modulus of rupture— psi | 4300 | 4500 | 3000 | 3100 |
| Modulus of elasticity × 1000 psi | 375 | 380 | 320 | 320 |
| Internal bond—psi | 110 | 150 | 110 | 125 |
| Screw holding—lbs. | 320 | 335 | 220 | 270 |

| | | | | |
|---|---|---|---|---|
| After 24 hr. immersion in water—% | | | | |
| thickness swell | 5.5 | 4.0 | 4.5 | 3.0 |
| % water absorption | 19.0 | 13.0 | 14.0 | 8.0 |

The foregoing table shows in columns 1 and 2 that fiberboard made with fiber produced from wood chips whose moisture content is in the range of 5 to 25 percent has properties which are superior to those made with fiber produced from chips whose moisture content is in the range of 30 to 60 percent, particularly with respect to the important properties of Internal Bond, Thickness Swell and Water Absorption.

The table also shows in columns 3 and 4 the same general improvement in board properties when the raw material is wood sawdust at 5 to 25 percent moisture content as compared to that made with fiber from sawdust whose moisture content is 30 to 60 percent.

It was considered unnecessary to make similar comparisons with and between boards heated by conventional hot platens, since at the thicknesses and densities involved, the press time would be so great as to render production by such means commercially impracticable.

It is clear that within the scope of this invention there may be considerable variation in the nature of the dry wood particles to be converted to fiber and in the formulation of the binder. It is essential that the wood particles to be fiberized shall have a moisture content less than 30 percent (wet basis), and that the binder shall be a low viscosity (under about 100 cps) solution of essentially unreacted ingredients of at least one thermosetting resin. As used herein, the term solution includes suspensions, colloids, or mixtures of solutions, suspensions and/or colloids. Preferably, the fiber resulting from the steaming and mechanical reduction of the wood particles are of a width and thickness approximately equal and substantially smaller in extent than their length. This invention, therefore, is not to be restricted to the specific examples given but only as set forth in the subjoined claims.

What is claimed is:

1. A method of producing fiberboard comprising subjecting a mass of wood particles that have previously been dried to a moisture content in the range of about 5 to 25 percent to steaming and mechanical reduction to form a mass of lignocellulosic material in fibrous form; mixing the latter with a solution of the essentially unreacted ingredients of a thermosetting resin; compressing the resulting mass to desired thickness between separately heated platens; creating between said platens and throughout said mass a high frequency electric field; and maintaining said field for a time sufficient to initiate and at least partially complete the reaction of said ingredients; said solution of essentially unreacted ingredients of thermosetting resin having a viscosity under about 100 c.p.s. and a resin solids content of at least about 45 percent.

2. A method according to claim 1 in which the frequency of the field is from about 3 to about 15 megacycles.

3. A method according to claim 1 in which the unreacted ingredients of the thermosetting resin are urea and formaldehyde.

4. A method according to claim 3 in which the frequency of the field is from about 3 to about 15 megacycles.

5. A method according to claim 1 in which the unreacted ingredients of the thermosetting resin are urea, melamine and formaldehyde.

6. A method according to claim 5 in which the frequency of the field is from about 3 to about 15 megacycles.

7. A method according to claim 1 in which the platens are maintained above 200° F.

* * * * *